United States Patent [19]
Lapham

[11] 3,968,893
[45] July 13, 1976

[54] MATERIAL HANDLING VEHICLE WITH H-SHAPED WALK AREA

[75] Inventor: Sidney D. Lapham, Walnut Creek, Calif.

[73] Assignee: Lapham Engineering Co., Inc., Martinez, Calif.

[22] Filed: June 24, 1974

[21] Appl. No.: 482,315

Related U.S. Application Data
[62] Division of Ser. No. 266,219, June 26, 1972, Pat. No. 3,825,130.

[52] U.S. Cl.............................. 214/700; 180/14 R
[51] Int. Cl.²....................................... B65G 47/00
[58] Field of Search.......... 214/700, 701 R, 16.4 A, 214/16 B, 660, 670; 180/25 R–27, 14

[56] References Cited
UNITED STATES PATENTS

| | | |
|---|---|---|
| 1,563,650 | 12/1925 | Pleines................................ 214/700 |
| 2,899,093 | 8/1959 | Morrell............................... 214/700 |
| 3,039,637 | 6/1962 | Akiep................................ 214/670 |
| 3,289,872 | 12/1966 | Pergtoner et al. .............. 214/701 R |

*Primary Examiner*—Frank E. Werner
*Assistant Examiner*—R. B. Johnson
*Attorney, Agent, or Firm*—Phillips, Moore, Weissenberger, Lempio & Strabala

[57] ABSTRACT

A dispensary type warehousing system featuring palletizing vehicle providing a mobile platform work station, together with pick aisles sufficiently narrow so that all merchandise to be picked is within the picker's reach without the need for leaving the vehicle. The invention makes it unnecessary for the picker to dismount from the mobile platform to perform his task, and this in turn permits partial automation of the vehicle control equipment as shown.

12 Claims, 17 Drawing Figures

FIG_3

FIG_4

FIG_7

FIG_6

FIG_8

FIG_9

FIG_10

FIG_11

MATERIAL HANDLING VEHICLE WITH H-SHAPED WALK AREA

CROSS REFERENCE TO RELATED APPLICATION

This is a division of Ser. No. 266,219, filed June 26, 1972 now U.S. Pat. No. 3,825,130 granted on July 23, 1974.

BACKGROUND OF THE INVENTION

Distribution warehouses for groceries and similar merchandise lines essentially carry out the following functions: (a) pallets of merchandise are received from individual suppliers; (b) the merchandise is stored out of the weather pending distribution; (c) portions of pallets (e.g. one or more cases of merchandise) are picked and combined with other cases to form new pallets containing a mixture of products; and (d) the mixed pallets are shipped to the retail stores.

In a conventional grocery warehouse, three types of storage are provided: (I) block storage, where pallets holding a large quantity of incoming merchandise are stacked in a storage area on top of one another as high as a fork lift truck can reach; (II) pick storage, where two or three single-product pallets are stored in a pick area on the floor or on individual shelves within the picker's reach for picking a product mix; and (III) stock storage, where two or three single product pallets are stored in the pick area on a shelf or tier above the picker's reach, for the purpose of replenishing the pick stock as it becomes exhausted.

In order to move merchandise from the receiving dock to the shipping dock, the following operations are involved in a conventional warehouse: (1) incoming pallets, which are commonly about two to four feet in height are stacked two or three high to form a pallet stack approximately six to eight feet in height, which a fork lift truck can handle as a unit; (2) the pallet stacks are moved from the receiving area to the appropriate block storage bay; (3) individual pallet stacks are moved from the block storage bay to the stock storage shelf of the appropriate pick bay; (4) individual pallets are moved from the stock storage shelf to the pick shelves or floor below; (5) the products are picked and assembled into mixed-product pallets; and (6) the mixed-product pallets are moved to the shipping area.

Because steps (1) through (4) above involve vertical movement of pallets at substantial heights above the floor, they require the use of fork lift trucks. These are expensive, cumbersome vehicles which are relatively slow and difficult to operate, and which require a great deal of maneuvering room. Inasmuch as steps (3) and (4) require the use of a fork lift truck in the pick area aisles, the minimum aisle width for the pick area of a conventional warehouse is about twelve feet.

The most common pallet size in the grocery industry is about 48 inches by 40 inches, with the height of the pallet depending on the package size of the product involved. In the block storage area, where all handling is done by fork lift truck, it is practical to store pallets 2 or sometimes even 3 deep transversely to the aisle. In the pick area, however, the reach limitation of the picker dictates storage only one pallet deep.

In the conventional warehousing system, the racks in the pick area must of necessity be supported by vertical supports or legs at fairly close intervals. In addition, the positioning tolerances for pallets handled by fork lift trucks require about 6 inches between pallets, so that the conventional system requires about 48 inches per pallet space (the long dimension of the pallet being transverse to the aisle when stored).

A conventional warehouse bay is 60 feet × 40 feet in size. With the 12-foot aisles of the conventional system disposed transversely to the bay, 60 pallet spaces can be accommodated by a standard bay in the conventional system. Considering the large number of different products handled by the average grocery warehouse, it is necessary to store about 50 to 60 different products, on the average, in each pick area bay if the warehouse building is to remain within a conveniently useable and economically justifiable size. Consequently, only one pallet space of the pick area can normally be allocated to any one product.

Experience has shown that the majority of products in a typical chain store warehouse are picked at the rate of about 60 to 120 cases per day. With the reach of an average man being about 6 feet 6 inches, and about 6 inches being consumed by the shelf and shelf clearance in the conventional pick storage, one pallet space of the conventional system can accommodate two pallets per tier of 40 cubic feet or less each; in other words, a total of no more than 80 cubic feet of pick storage product. This means that more often than not, the pick storage of any given product is exhausted before the end of the day, and a fork lift truck has to be called in to replenish the pick storage from the stock storage.

Aside from creating movement problems for the picker due to the fork lift's blocking the pick aisle during the replenishing operation, the conventional system often results either in a delay between exhaustion and replenishing, or in replenishing before all cases of the product have been picked from pick storage. In the latter event, when the pick storage is replenished with full pallets, leftover cases of product are frequently placed on the floor in front of the pick storage pallet, where they obstruct the aisle.

A further disadvantage of the conventional system is that the picker, who works on the floor, cannot load a mixed pallet on a cart to more than about 6 feet from the floor without exceeding his reach. Inasmuch as the bed of the cart is typically about 2 feet off the floor, the maximum mixed pallet height is about 4 feet.

Experience has shown that in a conventional warehouse, using the most efficient type of conventional picking equipment, the average picker picks on the order of 1,000 cases of product per 8-hour shift. Inasmuch as a warehouse of the size contemplated herein can accommodate no more than about 100 pickers per shift, lest they get in each other's way, the output capacity of the warehouse is about 100,000 cases per shift. It should be noted that each shift requires its own complement of machinery, as the batteries of most electrically driven warehousing machinery are designed for 8-hour work, 16-hour charge cycles.

In addition to the replenishing which is done during the regular work shifts, it is common practice in grocery warehouses to replenish the pick storage and stock storage during the night, when the fork lift operators can work without interfering with the pickers.

SUMMARY OF THE INVENTION

In accordance with the invention, the output capacity of the typical warehouse described above can be doubled (or, in the alternative, the size of its picking crew cut in half) by combining a novel and, at first glance, quite wasteful-appearing storage pattern with a palletizing vehicle specially adapted for use in conjunction with the novel storage pattern.

The gist of the invention resides in combining the elimination of stock storage with a palletizing vehicle which provides an elevated work platform directly adjacent to the pallets to pick storage, and a recessed mixed pallet support surrounded by the elevated platform on three sides and located below the level of the platform. By eliminating the stock storage, the system of this invention eliminates the use of fork lift trucks in the pick area. As a result, the pick aisles can be made much narrower; narrow enough, in fact, to be scarcely wider than the width of the palletizing vehicle.

The elimination of stock storage further reduces handling of the merchandise by eliminating handling step (3) described above. In addition, the movement of single-product pallets from the block storage area to the pick area can now be performed by small, highly maneuverable, and inexpensive conventional pallet transporters instead of fork lift trucks. Furthermore, the lack of height restrictions due to the rack structure in pick storage and the added reach provided by the elevated platform of the palletizing vehicle makes practical the use of single-product pallets 7 feet high, so that step (1), the stacking step, can also be eliminated.

The maneuverability of the pallet transporters permits a reduction of the space between pallets in pick storage from 6 inches to about 2 inches. The elimination of the racks also eliminates the space requirement for the rack supports. As a result, a typical 60 feet × 40 feet bay contains 102 pallet spaces in the system of the invention, each of which can accommodate more than 100 cubic feet of merchandise. The total pick storage capacity of the bay is thus increased to over 100,000 cubic feet from the less than 4,800 cubic feet of the conventional system.

It follows from the more than doubling of the pick storage capacity that for essentially all except fairly slow-moving products, the pallets previously stored in stock storage can now be stored in pick storage on a two-pallet-spaces-per-product basis (dual pallet storage) for most products. The more than 200 cubic feet of each product which thus become available to the picker represent a quantity well in excess of what can be expected to be picked in the course of a day. Thus, replenishment of pick storage during the picking shift is eliminated except on a few occasions. Likewise, the resultant replacement of pallets only when they are empty eliminates the problem of leftover cases.

The palletizing vehicle of this invention holds the bottom of the mixed pallet being assembled just clear of the floor. With the picker standing on the elevated platform of the vehicle, he can easily assemble a 7-foot mixed pallet suitable for loading into a truck without restacking. The palletizing vehicle can deposit the completed pallet on the floor at the loading dock, where it can be picked up when desired with a pallet transporter and loaded into the truck without the assistance of a fork lift truck. By contrast, in the conventional system, fork lift trucks were usually required for lifting completed pallets off the palletizing carts and stacking them in the truck, a process which often congested the loading area.

Specifically, the palletizing vehicle of this invention includes combined steering and control means for operating the vehicle and batteries for supplying motive power for the vehicle. An H-shaped walkway is disposed on the vehicle with the motor and batteries occupying the forward end between the front legs of the H-shaped walkway, with a low pick-up fork disposed at the rearward end between the rear legs of the H-shaped walkway and extending past the rear of the vehicle. In this manner, mixed pallets can be readily built up on the vehicle while the picker, using the storage system of this invention, never needs to leave the vehicle. A pair of such vehicles may be shipped as a generally compact unit, thus lowering the shipping costs thereof.

It is therefore the object of this invention to provide a warehousing system capable of approximately doubling the output capacity per man-day of conventional warehouses while substantially reducing machinery and fixture costs.

It is another object of this invention to provide a palletizing vehicle specially adapted for the efficient palletizing of a product mix.

It is still another object of the invention to provide a merchandise storage pattern for grocery warehouses and the like which, when used in conjunction with the palletizing vehicle of this invention, greatly speeds up the picking operation.

It is a further object of this invention to provide a palletizing vehicle of the type described which, in addition to driving and control means, features a platform forming elevated walkways along the sides of the pallet, a pallet support surrounded on three sides by said platform and positioned substantially below the level of said platform, and means for moving the pallet support between a position where it holds the pallet slightly off the ground and a position where it deposits the pallet on the floor so that it can be disengaged from the pallet.

It is a still further object of the invention to provide a palletizing vehicle of the type described in which the pallet support is located inside the polygon defined by its walkways.

DESCRIPTION OF THE PREFERRED EMBODIMENT

The basic concept of the invention is the creation of a movable work station for the picker in a distribution warehouse, and to bring the merchandise within the reach of a picker working on the movable work station so that he never need leave it in the course of his work.

In order to achieve this objective, the invention encompasses not only the mechanics of the movable work station itself, but also the particular physical arrangement of the merchandise in the pick bays of the warehouse which makes it possible to bring the merchandise within the picker's reach.

The advantage achieved by the invention is the elimination of the time-consuming walking to and from the palletizing vehicle or work station in conventional distribution warehouses. The advantage is achieved by sacrificing the utilization of air rights in the pick bays so as to eliminate the need for mechanical vertical movement of merchandise in the pick bays, which underlies the need for the wide pick aisles of the conventional distribution warehouse that generate the walking requirement and other inefficiencies and safety hazards eliminated by this invention.

Thus, the present invention, though at first glance highly wasteful of warehouse space, in fact cuts warehousing costs about in half by making possible highly efficient utilization of floor space, manpower, and equipment without substantially reducing the total storage capacity of the warehouse.

Figure 1A:
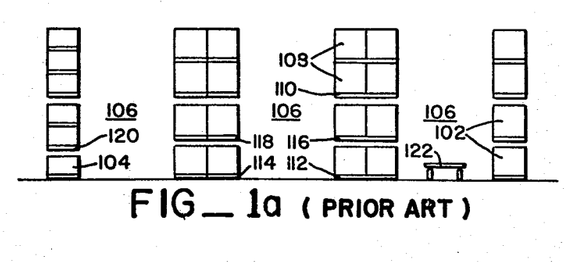
FIGS. 1a through 1d are elevational views of warehouse storage systems contrasting a prior art system with the system of my invention.
Figure 2A:
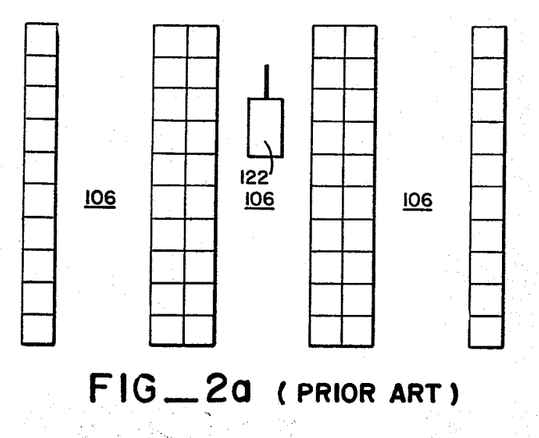

FIGS. 1a and 2a show an elevation and plan view, respectively, of the presently conventional grocery warehouse arrangement. The most common pallet size is 40 inches × 48 inches, with 40 inches (pallets 102 in FIG. 1a) and 18 inches (pallets 104 in FIG. 1a) being common pallet heights. In the conventional pick area arrangement shown in FIGS. 1a and 2a, pallets are stored one deep along each side of aisles 106, which are about twelve feet wide to provide maneuvering room for fork lift trucks. The need for this maneuvering room arises from the storage of replenishment stock pallets 108 out of the picker's reach on the shelves 110 of racks extending alongside the aisles 106 throughout their entire lengths.

The pick storage is done partly on the floor (as for pallets 112, 114) and partly on lower shelves (116 or 118, 120) within the reach of the picker. As the pick storage is exhausted, it is replenished by moving the pallets 108 down to the pick storage locations by means of a fork lift truck. At the end of the workday, replenishment stock pallets 108 are replaced out of block storage.

Due to the width of the aisles 106, a substantial part of the picker's time is spent walking to and from pick locations as he assembles a mixed pallet on a palletizing cart 122 standing in aisle 106.

For block storage of single-product pallets prior to their movement to the pick area, incoming pallets are stacked in the receiving area (not shown) into pallet stacks 124 (FIG. 1b) which are typically about six to seven feet high and generally consist of two 40-inch pallets or four 18-inch pallets, each including a wooden pallet base typically about five inches thick. Each of the pallet stacks 124 represents one normal fork lift load. The pallet stacks 124 are then in turn stacked in the block storage areas in bay arrangements such as shown in FIGS. 1b and 2b.

Figure 1B:
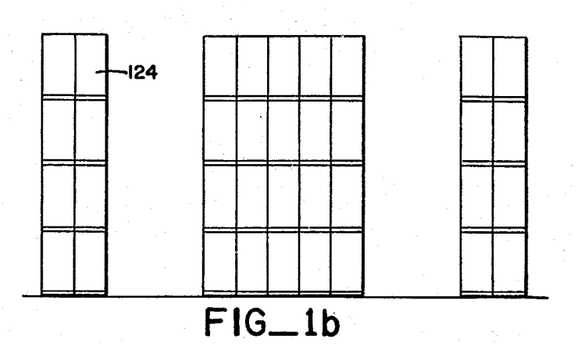
Figure 2B:
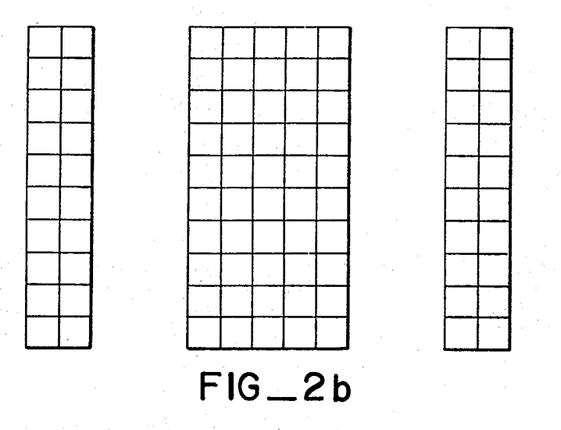

Considering that pallets moved by fork lift trucks require 8-inch clearances between pallets, a typical pallet space in FIGS. 2a and 2b is 4 feet × 4 feet in size. Using the more common 40 inch high pallet as a standard and assuming, conservatively, that the product is stacked 36 inches high on the 40-inch pallets (the other 4 inches being taken up by the wooden pallet base), a pick area bay of the conventional warehouse of FIGS. 1a and 2a can accommodate 9,600 cubic feet of product (60 spaces × 4 pallets per square × 40 cubic feet of product per pallet), of which 4,800 cubic feet (two pallets per space) are available for picking when the 40 feet × 60 feet bay of FIG. 2a is full. Thus, the system of this invention results in far better utilization of the cubic space of the warehouse than does the conventional system.

The block storage layout of FIGS. 1b and 2b, which is the most practical conventional layout, and which is retained in the system of this invention, typically accommodates, within the reach of a fork lift truck, 23,760 cubic feet of product, assuming again the use of forty-inch high pallets.

Figures 1C, 1D, 2C, 2D, 5:
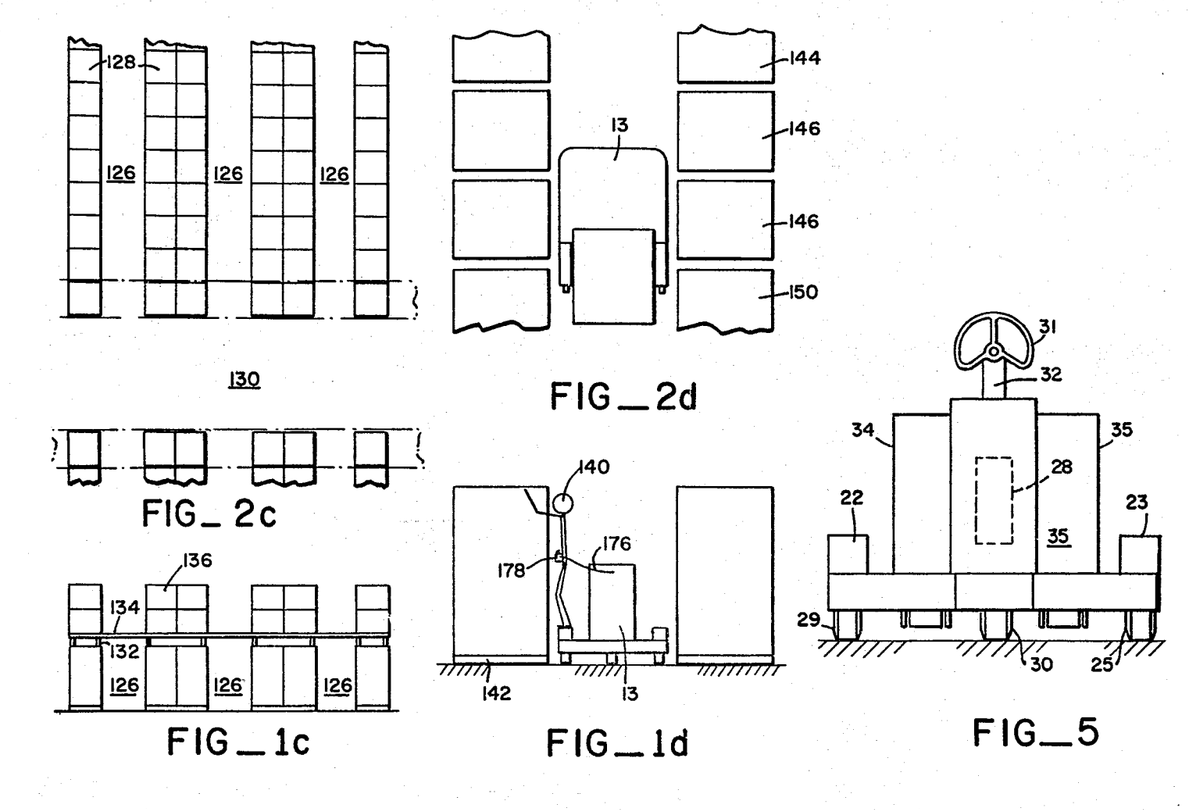
FIGS. 2a through 2d are top plan views of the systems of FIGS. 1a through 1d, respectively.
FIG. 5 is a front view of the vehicle of FIGS. 3 and 4.

In accordance with the invention, the pick area storage system is changed from that shown in FIGS. 1a and 2a to that shown in FIGS. 1c and 2c. The arrangement of FIG. 2c still has three pick aisles 126, but unlike the aisles 106 of FIG. 2a, the aisles 126 are disposed lengthwise of the bay and are much narrower — preferably only about 64 inches wide.

Inasmuch as the narrow width of the aisles 126 precludes the use of fork lift equipment, pallets in the pick area of FIGS. 1c and 2c can only be stored on the floor, not on shelves. Placement of the pallets in this case is done by pallet transporters (not shown), which are low, easily maneuverable, small powered vehicles capable of moving pallets from one place to another but not of lifting them more than a few inches off the floor.

The maneuverability of the pallet transporters and the fact that all pallets are placed on the floor permits fast, accurate placement of pallets in the pick area with minimum clearance (as little as 2 inches) between pallets. As a result, seventeen pallet spaces 128 are available in the system of FIG. 2c on each side of the aisle 126, for a total of 102 pallet spaces per pick bay. In addition, if one of the short sides of the bay of FIG. 2c adjoins a cross-aisle 130 (i.e. a wide aisle for travel to and from the block storage and shipping areas), rack storage like that of FIG. 1a is possible along cross-aisle 130, preferably for slower-moving types of products which do not require frequent replenishment. For this purpose, racks 132 may be provided with appropriate shelves 134 located sufficiently high (e.g., 8 feet) above the floor to allow the palletizing vehicle of this invention (See FIG. 1d) to pass under them.

As the pallets 136 stored on shelf 134 are needed, they can be placed in the pallet spaces underneath the rack 132 with a fork lift truck, and can then be picked from the aisles 126 like the other pallets in the pick area of FIG. 2c.

The fact that aisles 126 are narrow enough to clear the palletizing vehicle 13 shown in the enlarged views 1d and 2d of FIGS. 1c and 2c, respectively, by only about 4 inches on each side makes it possible for the picker 140 to remain on the elevated platform of the vehicle 13 at all times and thus extend his reach to some 7½ feet from the floor. Thus, even assuming the use of a heavy six-inch-thick pallet base 142 in the system of this invention, the product can be stacked 7 feet high on the pallet base 142 without exceeding the reach of picker 140. Assuming (for reasons discussed below) that the product is stacked, on the average, only 6½ feet high on each pallet base, the storage capacity (even in the absence of racks 132) of the pick bay of FIGS. 1c and 2c is 8,850 cubic feet of product — all of it available for picking.

In a typical grocery warehouse of manageable size, the number of products handled is such that only one pick area pallet space can be allocated to each of the most commonly used products. However, in order to follow a first-in, first-out policy of use, it is necessary to place two pallets of each product side by side so that one can be replaced while the other is being picked. This is the reason why, in the conventional system, pallets 112 and 116 are different products, whereas pallet 112 and the pallet (not shown) next to it on the same aisle are the same product. Consequently, particularly since some space has to be left between the top of each pallet and the underside of the shelf above it, the pallet height in the conventional system is limited to around 40 inches.

In the system of this invention, the circumstances dictating the 40inches pallet height restriction are absent. Consequently, the only restriction on pallet height is the vertical clearance of the truck door — usually 7½ feet. Hence, the maximum practical pallet height is about 7 feet including the pallet base, or roughly the aforementioned 6½ feet of product. Inasmuch as the pick bay of FIG. 2c has, however, almost twice as many pallet spaces as the conventional pick bay of FIG. 2a, it is practical to use two pallet spaces, on the average, for each product. Thus, in FIG. 2d, pallets 144 may be one product, and pallets 148, 150 another. It will be seen that whereas, in the conventional system, the picker had no more than 80 cubic feet of product available to him at any time, the picker in the system of the invention has as much as 200-odd cubic feet of the same product at his disposal — enough to pick more than twice as long between replenishings.

Figure 10:
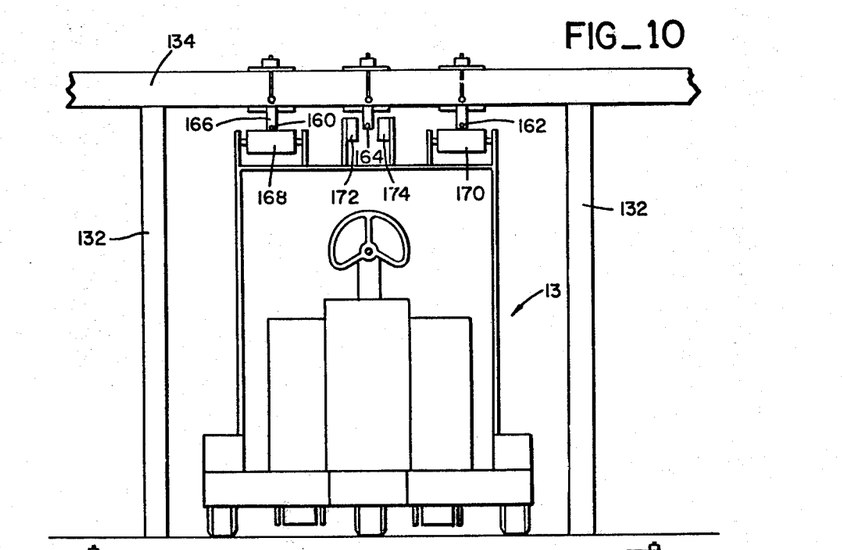
FIGS. 10 and 11 illustrate a charging and guiding system for the vehicle of this invention.
Figure 11:
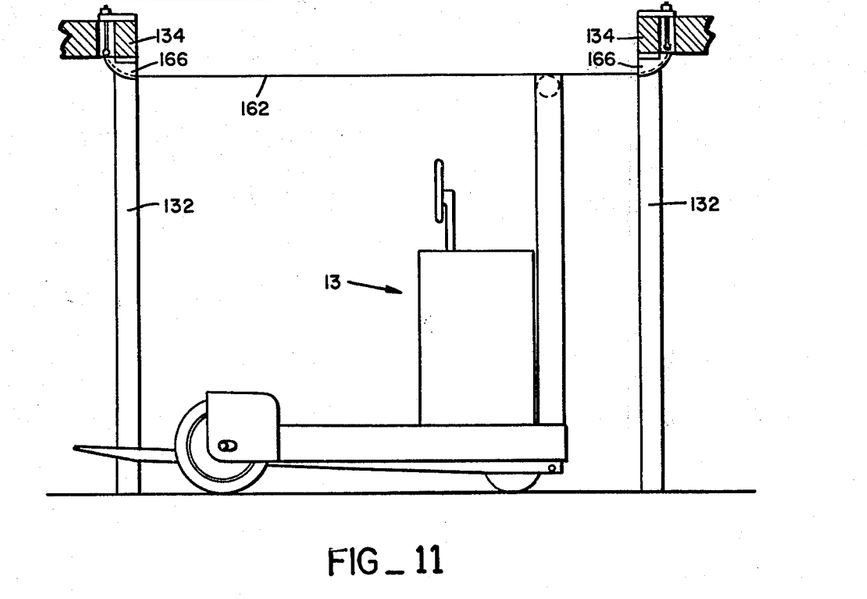

Time-and-motion studies have established that the system of this invention approximately doubles the pick rate per man-day of the picking crew, even without the use of the automated equipment of FIGS. 10 and 11. In addition, it substantially eliminates the use of a replenishing crew during picking shifts and the consequent interference with the pickers. Also, by making possible the use of 7-foot pallets, the receiving area stacking step is eliminated, as is the double movement between block storage and pick storage. Finally, the use of seven-foot pallets increases the capacity of the average block storage bay from about 23,760 to about 25,800 cubic feet of product.

Conventional warehousing systems use palletizing carts whose bed is about 2 feet off the floor. Assuming a 6 feet reach, the picker cannot conveniently assemble mixed pallets higher than 4 feet in the conventional system. Thus, the conventional system usually fails to effectively utilize the 7½ feet interior height of conventional trucks. By contrast, the low position of the pallet supporting forks 36 (FIG. 4) in the vehicle 13 of this invention, together with the height of the platform 17—18—19 and the pads 22, 23, allow a mixed pallet to be stacked to the full 7-foot-plus height which the truck can accommodate. Inasmuch as the palletizing vehicle 13 can deposit the mixed pallet on the floor of the shipping area, and a pallet transporter can move it from there into the truck, the use of a fork lift truck at the shipping area is eliminated by the system of this invention.

Figure 3:
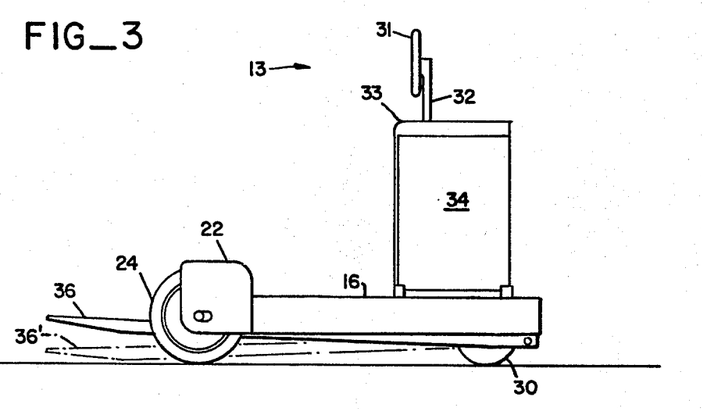
FIG. 3 is a vertical view of a palletizing vehicle in accordance with my invention to be used in the system of FIGS. 1 and 2.
Figure 4:
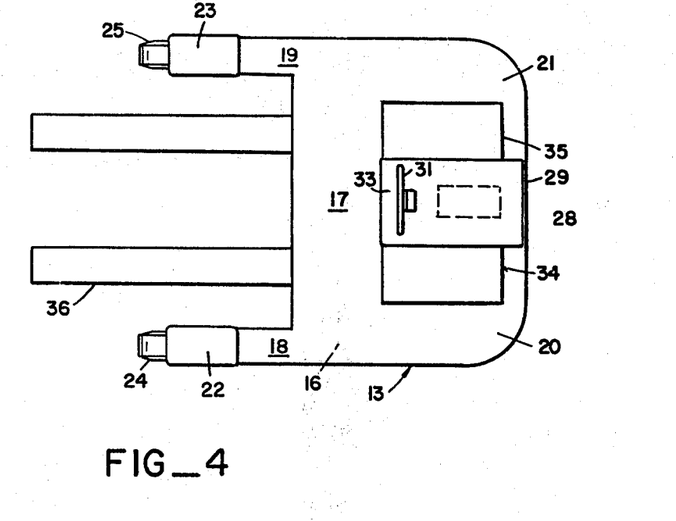
FIG. 4 is a top plan view of the vehicle of FIG. 3.

Referring now to FIG. 3 and 4, vehicle 13 includes a first generally horizontal supporting surface in the form of an H-shaped walkway 16. Walkway 16 includes a first centrally located section 17 normal to a pair of second and third side sections 18 and 19. As can be seen in FIG. 4, sections 18 and 19 extend from the front to the rear of vehicle 13. At the front of vehicle 13, sections 18 and 19 include a pair of front sections 20 and 21, respectively. In this manner, an H-shaped walkway 16 is formed and an operator can walk almost completely about the periphery of vehicle 13 and across the short axis thereof (i.e., first section 17).

One or more horizontal levels, such as second horizontal level, is formed on vehicle 13 by means of a pair of wheel covers 22 and 23. Covers 22 and 23 are integrally connected to an extend upwardly from sections 18 and 19, respectively, at the rear thereof. As can clearly be seen in FIG. 3, covers 22 and 23, preferably at the same horizontal level, form a second or upper support surface vertically spaced from the first support surface of vehicle 13 (i.e., walkway 16). A pair of rear wheels 24 and 25 are journalled for rotational movement in covers 22 and 23, respectively.

As shown in dotted lines in FIGS. 4 and 5, a conventional battery-driven motor 23 is disposed in a motor housing 29 which is centrally located at the forward end of vehicle 13 and extends from the supporting surface of vehicle 13. A single front wheel 30 is preferably driven by motor 28 by any suitable drive means. Wheel 30 is steered by means of a steering wheel 31 connected by shaft 32 which extends out of the top of motor housing 29. Steering wheel 31 may also be removable for shipping purposes. Finally, housing 29 includes a suitable console 33 or the like for operating motor 28.

Any suitable motive means may be used for operating vehicle 13. Thus, console 33, motor 28, drive wheel 30, steering wheel 31 and shaft 32 may all be conventional mechanisms or the like for propelling and steering vehicle 13. However, in accordance with the teachings of my invention, motor 28 is electrically driven by suitable batteries or the like.

Thus, as shown in FIGS. 3 through 5, a pair of battery housings 34 and 35 are disposed at the forward end of vehicle 13 and on each side of motor housing 29 (the batteries themselves not being visible). Such relatively large housings are required in view of the tremendous amount of electrical power required to operate motor 28 and thus render vehicle 13 entirely self-contained. These battery housings 34 and 35 (and, of course, the batteries themselves) may be removable from vehicle 13 and shipped separately for reasons to be discussed hereinbelow.

Referring once again to FIG. 4, the fork 36 is disposed at the rear of vehicle 13 and extends underneath walkway 16 and outwardly a short distance past the rear of vehicle 13. That is, fork 36 is generally parallel to and spaced from sections 18 and 19 of walkway 16. Such a fork 36 forms a fork lift for vehicle 13 and is of a size to engage and lift conventional pallets as is well known in the art and described hereinabove with respect to FIGS. 1 and 2.

Figure 6:
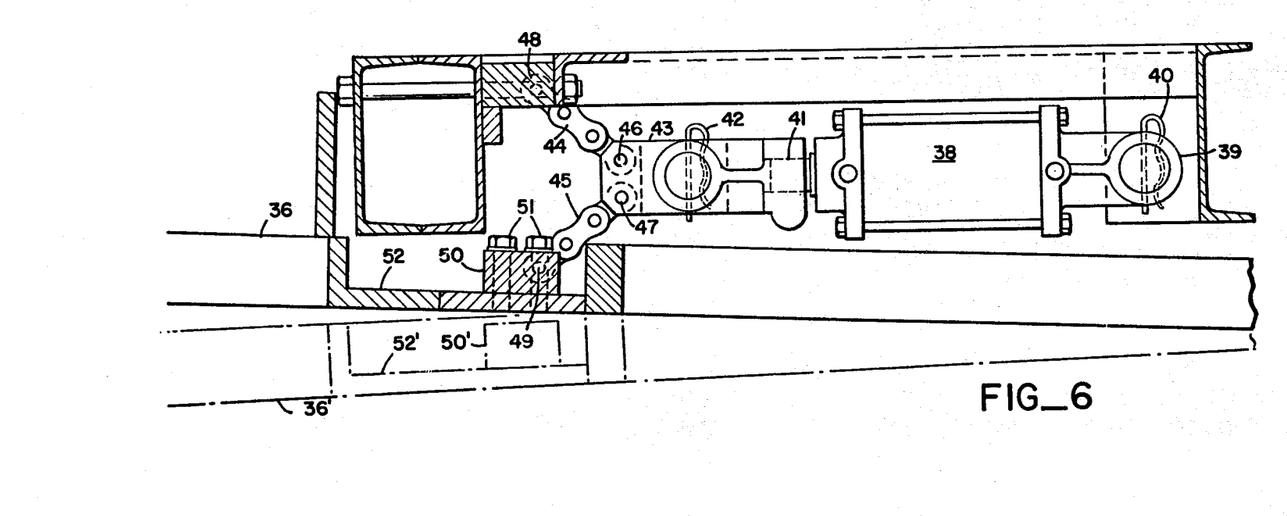
FIG. 6 is a vertical detailed view of a portion of the vehicle of FIGS. 3–5 with portions thereof in section and other portions omitted for convenience of illustration.
Figure 7:
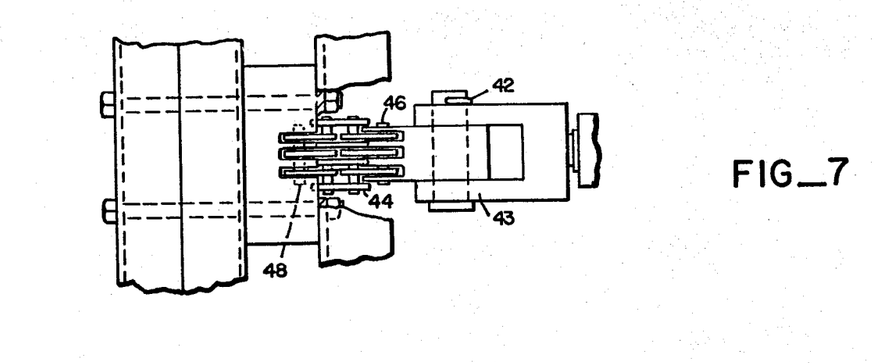
FIG. 7 is a top plan view of a portion of the view of FIG. 6.

As shown by the dotted lines 36' in FIG. 3 and more particularly in FIG. 6, fork 36 is vertically movable (actually in an arc) with respect to vehicle 13. Thus, as shown in FIG. 6, a conventional hydraulic cylinder 38 or the like is fixedly connected at one end to a point on the undersurface of vehicle 13 by means of a conventional pin 39 and snap ring 40. The piston rod 41 of cylinder 38 is connected by means of a snap ring 42 to a clevis 43 (see also FIG. 7). A pair of chain links 44 and 45 are pivotally connected at the forward end of clevis 43 (at points 46 and 47, respectively). The free end of link 44 is fixedly secured to a point 48 on the undersurface of walkway 16. The free end of link 45 is secured at point 49 to a block 50 secured by bolts 51 or the like to a flange member 52 integrally connected to the rear ends of fork 36.

In this manner, actuation of cylinder 38 from the console 33 (the connecting means being conventional and not shown) moves rod 41 which pivots link 45 to raise and lower the fork 36 integrally connected thereto.

Figure 8:
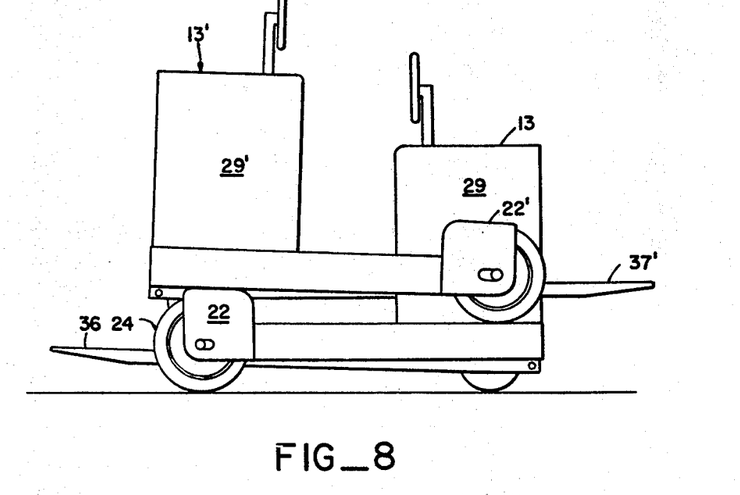
FIG. 8 is a vertical view of a pair of the vehicles of FIGS. 3 through 7 mounted for shipment thereof.
Figure 9:
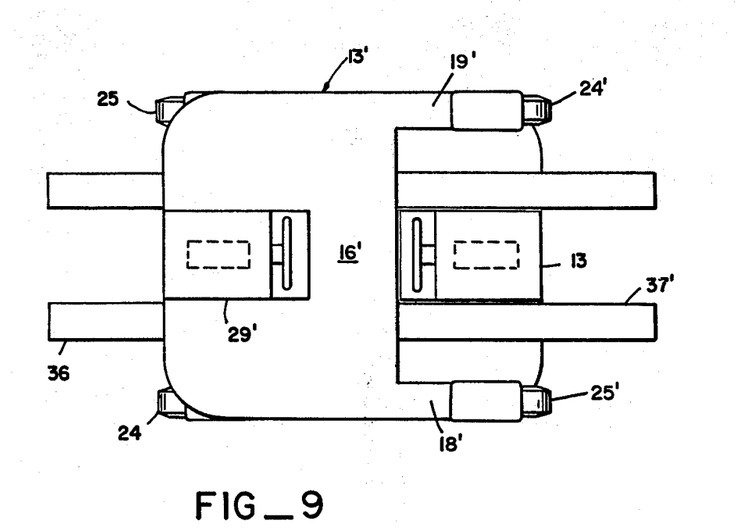
FIG. 9 is a top plan view of the mounted vehicles of FIG. 8.

As shown in FIGS. 8 and 9, a first vehicle 13 is shown with its batteries and battery housing removed for shipping purposes. A second vehicle 13' (primed numerals referring to like parts of vehicle 13 with 37' used for the fork of vehicle 13') with like parts removed, is shown loaded on top of and oriented in a reverse direction from first vehicle 13. As can be seen, the vehicles are so configured that the side rails (i.e., the portions 18' and 19' of walkway 16' of vehicle 13') of the top vehicle 13' and the tines of its fork straddle the motor housing 29 of vehicle 13. In this manner, a very compact generally rectangular "unit" is obtained which is extremely economical for shipping purposes. The two vehicles are separated at their delivery point and the removed portions may be put back onto their respective vehicles prior to operation thereof.

It can be seen from the foregoing that I have disclosed a unique material handling system and a vehicle for carrying out that system. In addition, I have disclosed a vehicle which can be shipped in an extremely economical manner.

FIGS. 10 and 11 illustrate a charging and guide system for the vehicle 13 which takes advantage of the previously described features of the invention. Inasmuch as the ends of the pick aisles 126 are provided with transversely disposed shelves 134 which clear the top of vehicle 13, it is readily possible to mount overhead power wires 160, 162, and a guide wire 164 in brackets 166 (FIG. 10) attached to shelves 134 to extend longitudinally along pick aisles 126.

The vehicle 13 may in this case be provided with collector rollers 168, 170 and guide sensors 172, 174 as shown in FIG. 11. The guide sensors 172, 174 are proximity sensors which cooperate with the guide wire 164 and conventional autopilot equipment (not shown) to automatically steer the vehicle 13 along the guide wire 164 as long as it is in the pick aisle 126.

This arrangement has the double advantage of assuring accurate guidance of the vehicle 13 in the very tight clearance of the pick aisle, while relieving the picker of the necessity to walk over to the control panel between picks and steer the vehicle 13 from one pick station to the next. Automatic steering in the pick aisle also permits the use of an umbilical cord 176 (FIG. 1d) through which the picker can be provided with remote control device 178 to control the forward motion of vehicle 13 from any point on the platform 17, 18, 19.

As for the power wire arrangement, it also has a double advantage in not only providing continuous charging for the batteries of vehicle 13 so as to avoid long charging periods for the vehicle 13 between work shifts, but also providing a convenient way of triggering (by conventional means) an appropriate warning system in the main aisles to show that a given pick aisle is occupied by a vehicle 13.

What is claimed is:
1. A motor-driven vehicle for handling materials comprising:

a. a plurality of wheels mounted on said vehicle;
b. steering means operatively engaging at least one of said wheels for turning said wheels for steering said vehicle along a supporting surface;
c. a battery-driven motor disposed at the forward end of said vehicle and operatively engaging at least one of said wheels for rotating said latter wheel and thus moving said vehicle along said supporting surface;
d. at least a pair of batteries disposed on opposite sides of said motor at the forward end of said vehicle and operatively engaging said motor for supplying electrical power thereto;
e. a generally H-shaped horizontal walkway on said vehicle extending both across the short axis of said vehicle generally at the midpoint thereof and from the rear end of said vehicle, about both sides of said batteries opposite the sides of said batteries adjacent said motor and terminating at the forward end of said vehicle with at least a portion thereof in front of said motor whereby an operator may walk almost completely about the periphery of the upper surface of said vehicle and across said vehicle, said motor and said batteries occupying the area between the forward end of said generally H-shaped walkway and a cutout area being disposed between the rear end of said generally H-shaped walkway; and
f. fork lift means carried by said vehicle disposed below said walkway and operatively connected to said motor for engaging a pallet and lifting said pallet with respect to said vehicle, said fork lift means including a fork having a pair of spaced fork tines extending outwardly past the rear of said vehicle and within the cutout area of said walkway.

2. The vehicle of claim 1 wherein the rear portion of said H-shaped walkway at the rear end of said vehicle includes at least one generally horizontal supporting surface spaced vertically above the remainder of said walkway.

3. The vehicle of claim 2 wherein said plurality of wheels includes a pair of spaced wheels journalled in a respective pair of wheel covers at the rear end of said vehicle and said vehicle includes at least two of said supporting surfaces, each of said supporting surfaces being the uppermost portion of each of said wheel covers.

4. The vehicle of claim 1 wherein each of said batteries and said motor are enclosed in a housing, the uppermost, front and rear portions thereof being generally flush to each other.

5. The vehicle of claim 1 wherein said plurality of wheels includes a pair of wheels at the rear end of said vehicle on each side thereof journalled within a portion of said vehicle for rotational movement thereof, said vehicle further comprising a single wheel journalled in another portion of said vehicle at the front end thereof and at generally the midpoint thereof, said motor and steering means operatively engaging said single wheel.

6. The vehicle of claim 1 wherein said fork lift means includes a fluid-activated cylinder operatively connected to said motor and activated thereby, the piston rod of said cylinder being pivotally connected to a pair of chain links, one of said chain links being fixedly connected to the underside of said vehicle and the other of said chain links being pivotally connected to the rear of said pair of tines of said fork whereby actuation of said cylinder via said motor moves said rod to pivot said links and thereby raise and lower fork carried thereby.

7. A material handling system for moving goods from one location to another wherein said goods are stacked on top of each other in a generally vertical manner on a supporting surface with an aisle separating stacks of said goods, said system comprising:
   a. means for moving said goods from said stacks on both sides of said aisle, said means including a motor-driven vehicle including a plurality of wheels mounted on said vehicle;
   b. steering means operatively engaging at least one of said sheels for turning said wheels for steering said vehicle along a supporting surface;
   c. a battery driven motor disposed at the forward end of said vehicle and operatively engaging at least one of said wheels for rotating said latter wheel and thus moving said vehicle along said supporting surface;
   d. at least a pair of batteries disposed on opposite sides of said motor at the forward end of said vehicle and operatively engaging said motor for supplying electrical power thereto;
   e. a generally H-shaped horizontal walkway on said vehicle extending both across that short axis of said vehicle generally at the midpoint thereof and from the rear end of said vehicle, about both sides of said batteries opposite the sides of said batteries adjacent said motor and terminating at the forward end of said vehicle with at least a portion thereof in front of said motor whereby an operator may walk almost completely about the periphery of the upper surface of said vehicle and across said vehicle from one stack on one side of the aisle to the other without leaving said vehicle;
   f. said motor and said batteries occupying the area between the forward end of said generally H-shaped walkway and a cutout area being disposed between the rear end of said generally H-shaped walkway; and
   g. fork lift means carried by said vehicle disposed below said walkway and operatively connected to said motor for engaging a pallet and lifting said pallet with respect to said vehicle, said fork lift means including a fork having a pair of spaced fork tines extending outwardly past the rear of said vehicle and within the cutout area of said walkway.

8. The system of claim 7 wherein the rear portion of said H-shaped walkway at the rear end of said vehicle includes at least one generally horizontal supporting surface spaced vertically above the remainder of said walkway.

9. The vehicle of claim 8 wherein said plurality of wheels includes a pair of spaced wheels journalled in a respective pair of wheel covers at the rear end of said vehicle and said vehicle includes at least two of said supporting surfaces, each of said supporting surfaces being the uppermost portion of each of said wheel covers.

10. The vehicle of claim 7 wherein each of said batteries and said motor are enclosed in a housing, the uppermost, front and rear portions thereof being generally flush to each other.

11. The vehicle of claim 7 wherein said plurality of wheels includes a pair of wheels at the rear end of said vehicle on each side thereof journalled within a portion of said vehicle for rotational movement thereof; and
   a single wheel journalled in another portion of said vehicle at the front end thereof and at generally the midpoint thereof, said motor and steering means operatively engaging said single wheel.

12. The vehicle of claim 7 wherein said fork lift means includes a fluid-activated cylinder operatively connected to said motor and activated thereby, the piston rod of said cylinder being pivotally connected to a pair of chain links, one of said chain links being fixedly connected to the underside of said vehicle and the other of said chain links being pivotally connected to the rear of said pair of fork tines whereby actuation of said cylinder via said motor moves said rod to pivot said links and thereby raise and lower said fork carried thereby.

* * * * *